Jan. 1, 1935.                C. H. WALKER                1,986,694
                            GLASS GASKET STRIP
                           Filed April 13, 1934
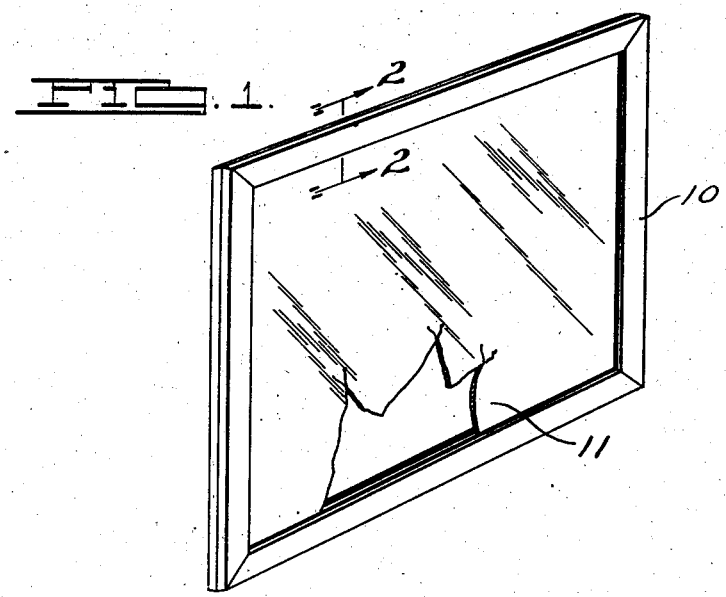
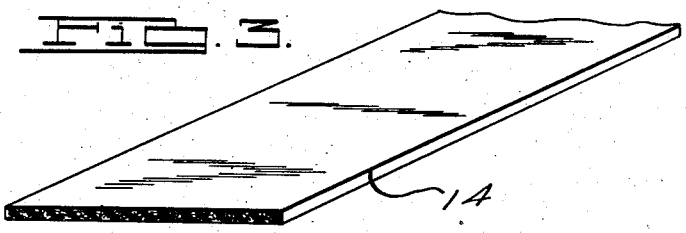
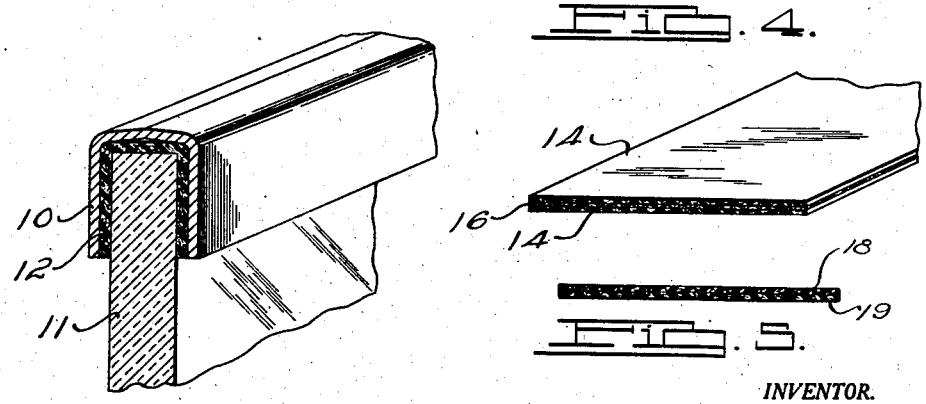
INVENTOR.
Charles H. Walker.
BY
Harness, Dickey, Pierce & Hann.
ATTORNEYS.

Patented Jan. 1, 1935

1,986,694

UNITED STATES PATENT OFFICE 1,986,694

GLASS GASKET STRIP

Charles H. Walker, Detroit, Mich.

Application April 13, 1934, Serial No. 720,364

10 Claims. (Cl. 189—76)

The invention relates to gaskets and it has particular relation to a gasket material adapted to be placed in a metal channel for receiving the edge of a window glass or the like such as used in automobiles.

At the present time, and particularly in automobile constructions, it is common practice to mount windshields or other glass panels in metal frames where the frame is channel shape in cross section and receives the edge of the glass. In constructions of this character it is practically necessary to employ some form of strip between the edge of the glass and the channel so as to prevent rattling of the glass in the frame and to seal it in the channel. While strips have been provided for this purpose and are commonly used, it has been difficult to positively and permanently seal the edge of the glass in the channel and it is quite common to find that water leaks through between the edge of the glass and the metal frame. This leakage is particularly apt to occur in driving rain storms or where the automobile is being driven rather rapidly in rainy weather and the water is thrown against the glass panel with considerable force. It has also been difficult to provide a strip which can be easily disposed within the metal channel and around the edge of the glass while still obtaining a satisfactory sealing relation. Ordinary vulcanized rubber has been employed for this purpose but, unless the gasket is annular and extends entirely around the edge of the glass, it is difficult to obtain a proper fit between the ends and to seal the glass at the point where the ends are located. Furthermore, ordinary vulcanized rubber is an incompressible material and for this reason, it is difficult to manipulate it and obtain a close fit between the glass, gasket and metal channel and particularly where there are variations in dimensions as will invariably occur in manufacture. Aside from variations in dimensions that will occur in manufacturing both the glass and metal channel, it is quite usual to have metal channels and glasses of slightly different dimensions to be used on different body styles or different models and in these cases it is practically necessary to provide a different rubber gasket for each construction.

Felt gaskets have been employed but these are usually inefficient and do not seal the edge of the glass in the metal channel in a satisfactory and durable manner. Furthermore, these constructions are usually around the edge of the glass in the form of a strip and problems are involved in preventing leakage of water between the ends of the strip. Furthermore, felt gaskets usually allow some leakage and loose movement of the glass in the metal channel, particularly after the automobile has been in use for a while and forces such as wind pressure has acted to compress the walls of the felt through pressure on the glass.

One object of the present invention is to provide a gasket for sealing the edge of a glass in a metal channel which may be readily installed and which is of such construction that the edge of the glass is permanently sealed and is maintained tightly in the metal channel.

Another object of the invention is to provide a gasket of this character which has certain recovery characteristics so that after the gasket is installed it recovers or swells so to speak, so as to fill any voids or spaces to the end that the glass will be even more tightly held in the metal channel against looseness or rattling and a very positive sealing engagement will be obtained between the glass and metal channel.

Another object of the invention is to provide a gasket of this character which is effectively bonded to the glass and interior of the metal channel, thereby firmly anchoring the edge of the glass in the latter.

Another object of the invention is to provide a gasket material as an article of manufacture in flat strip form which may readily be wound peripherally of the edge of the glass and then folded over the sides of the glass around the edge to form a channel gasket adapted to positively seal the edge of the glass in the metal channel.

Another object of the invention is to provide an improved gasket material which efficiently serves as a cushion between the glass and the metal channel in which the glass is mounted.

Another object of the invention is to provide a method of manufacturing a rubber gasket of laminated construction.

Other objects of the invention will become apparent from the following description, the drawing relating thereto and the claims hereinafter set forth.

For a better understanding of the invention, reference may be had to the accompanying drawing wherein:

Figure 1 illustrates a glass mounted in a metal frame of channel shaped cross section, wherein the edge of the glass is sealed by using a gasket constructed according to one form of the invention.

Fig. 2 is a cross-sectional view on a larger scale, taken substantially along the line 2—2 of Fig. 1.

Fig. 3 is a fragmentary view of a gasket constructed according to one form of the invention as initially furnished and prior to its application to the edge of the glass and to the metal channel.

Fig. 4 is a fragmentary view similar to Fig. 3, illustrating a gasket material constructed according to another form of the invention.

Fig. 5 is a cross-sectional view illustrating a laminated construction of gasket material.

In Fig. 1 the metal frame member is indicated at 10 and the glass therein is indicated at 11 and it is to be understood that this frame may be varied in shape and that it may be used in automobiles or other places where window panels may be employed. As shown best by Fig. 2, the frame 10 comprises side members of channel shaped cross section and the edge of the glass projects into the channel. A gasket constructed according to one form of the invention is indicated at 12 and is of channel formation and is disposed between the metal channel and the edge of the glass. Metal frames of this character are applied around the edge of the glass in various ways and the sides may be initially separated and then joined together at the corners or the frame may be applied in other ways such as by having three sides integrally connected, inserting the glass from the open fourth side and then applying the fourth side of the frame. Various other ways of placing frames on the edges of a glass panel will be readily understood by those skilled in this art.

The gasket 12 may originally be manufactured in the form of a strip indicated at 14 in Fig. 3 which is of such width that when placed around the edge of the glass as shown by Fig. 2, it forms a channel of proper dimensions. Pursuant to one form of the invention, the gasket is constructed of crude and uncured rubber which is mixed with cotton and it has been found that a mixture of 30% cotton by volume is highly satisfactory. The cotton may be introduced into the crude and uncured rubber by milling operations or other mixing processes well understood in the rubber industry and this milling or mixing is continued until the cotton fibers are of the color of the rubber and invisible. After the proper mixture has been obtained, the compound or composition may be passed through calendering rolls for obtaining a flat sheet and then this sheet may be slit so as to obtain strips of proper widths such as shown by Fig. 3.

The cotton introduces a compressible ingredient and, when mixed with the crude and uncured rubber, provides a material which has a certain degree of compressibility. Using the crude and uncured rubber enables obtaining a tacky or somewhat sticky material, although this tacky condition is not such that the material cannot be handled manually as it ordinarily will not stick to the hand. As a matter of fact, the tacky condition is such that the material will not readily stick to the metal or glass without applying a little pressure and this enables handling of the material and initially applying it around the glass and positioning it in the channel without difficulty. It has been found that this material has very decided recovery characteristics and by this is meant that when the material is compressed, it tends to recover its original condition although when compressed this recovery is not instantaneous.

In applying a gasket of this character, the strip is slightly longer than the periphery of the glass to be used and then the strip is peripherally wound around the edge face of the glass and the ends thereof are overlapped and pressed together, in which position they are maintained by a natural bond which occurs. During this operation the edges of the strip may flex somewhat toward the sides of the glass. Then the glass and gasket so mounted thereon are slidably moved into the channel of the frame during which the side portions of the strip are pressed against the sides of the glass, so that the assembly becomes like that shown by Fig. 2. In the final assembly, the walls of the gasket become bonded to both the metal channel and the glass.

Use of the cotton fibers gives a desired inextensibility to the material so that when the strip is wound around the edge face of the glass, it does not stretch in an undesirable manner and permits the workmen to quickly apply the strip without tearing or elongating the strip in an undesirable way. The overlapping ends of the strip may be readily pressed together so that the final thickness of the overlapping portions is not such as to interfere with application of the metal frame. When the channel metal frame is applied, it has been found that by applying a little vaseline or cup grease to the gasket provides a desirable lubricant to facilitate application of the channel as ordinarily the glass is slidably moved into the channel. Furthermore, the use of vaseline or a lubricant acts to soften the gasket and to cause it to become sticky more quickly and it also acts to hasten the recovery characteristics of the material.

As shown by Fig. 4 the gasket is constructed by applying the rubber and cotton mixture to the sides of a thin strip of woven fabric 16 serving as a backing layer. Under certain circumstances, this construction of the gasket may be employed and, if desired, the rubber and cotton material might be placed only on one side of the fabric.

The construction shown by Fig. 5 is of laminated character and as shown two laminæ 18 and 19 are provided although more than two may be used. It has been determined that the laminated construction provides a better cushioning medium between the glass and channel and it also seems to be somewhat more flexible which facilitates its manipulation and application.

In manufacturing this construction, a batch of the mixed rubber and cotton may be fed between two heated calender rolls one of which has a slightly greater peripheral speed than the other and the sheet material after it passes between the rolls may be directed around the roll having the greater peripheral speed and then passed between this roll and a third heated roll operating at the same peripheral speed. During this process, it seems that the surface of the sheet which contacts with the first and slower roll is roughened to a certain extent whereas the other surface becomes smooth. Then two of the sheets thus manufactured may be passed in superposed relation with their rough surfaces adjacent, between other calender rolls operating at the same peripheral speed and this causes the sheets to be bonded together.

It has been stated that the laminated structure has better cushioning properties and while various factors may govern obtaining this result, it seems that in bonding the two rough surfaces minute voids may be obtained in which air may be trapped and that this increases the cushioning properties of the material. While this seems probable, the reason the laminated material has better cushioning properties and greater flexibility is not definitely known. It is apparent that the laminated structure in presenting smooth exposed surfaces, facilitates application of the strips in the metal channels.

Once a gasket constructed according to the invention is in place, the recovery characteristics of the rubber causes it to fill any and all voids as it swells, so to speak, and this provides a positive seal between the channel and the edge of the glass. Moreover the material actually bonds itself to the channel and glass in such a way that the latter is firmly anchored against looseness. Again the strip has improved cushioning properties that avoid breakage of the glass by vibration or the like. It may be mentioned also that the strip as provided always reveals a dark edge or edge having the color of the rubber and that even though cotton is employed, it is practically invisible. Even when the material is cut, the cotton does not become visible and the edge is smooth and not frayed.

Additionally, it has been found that gasket material constructed according to the invention has expansive and contractile characteristics that cause it to expand and contract approximately with the expansion and contraction of the channel and glass, thereby insuring a uniform mounting under varying atmospheric and climatic conditions.

Although more than one form of the invention has been illustrated and described in detail, it will be apparent to those skilled in the art that various modifications may be made without departing from the scope of the appended claims.

What is claimed is:

1. In combination, a metal channel for receiving the edge of a glass, a glass in the channel, and a channel shape gasket material within the metal channel and receiving the edge of the glass, said gasket material comprising an uncured rubber composition.

2. In combination, a metal channel for receiving the edge of a glass, a glass in the channel, and a channel shape gasket material within the metal channel and receiving the edge of the glass, said gasket material comprising a mixture of uncured rubber and fibrous material.

3. In combination, a metal channel for receiving the edge of a glass, a glass in the channel, and a channel shape gasket material within the metal channel and receiving the edge of the glass, said gasket material comprising a mixture of uncured rubber and cotton fibers.

4. In combination, a metal channel for receiving the edge of a glass, a glass in the channel, and a channel shape gasket material within the metal channel and receiving the edge of the glass, said gasket material comprising a backing coated with uncured rubber.

5. In combination, a metal channel for receiving the edge of a glass, a glass in the channel, and a channel shape gasket material within the metal channel and receiving the edge of the glass, said gasket material comprising a fabric backing coated with uncured rubber.

6. In combination, a metal channel for receiving the edge of a glass, a glass in the channel, and a channel shape gasket material within the metal channel and receiving the edge of the glass, said gasket material comprising a fabric backing coated with a mixture of uncured rubber and cotton fibers.

7. In combination, a metal channel for receiving the edge of a glass, a glass in the channel, and a channel shape gasket material within the metal channel and receiving the edge of the glass, said gasket material comprising an uncured rubber composition, and means for reinforcing the composition so as to decrease its extensibility.

8. The combination with a channel and a glass having its edge disposed in the channel of a gasket strip of channel shape disposed in the first channel and receiving the edge of the glass, said gasket strip comprising a fabric coated on one surface with uncured rubber.

9. A gasket strip adapted to be secured to one element and to receive an adjoining element such as the edge of a glass to bond the same thereto, said gasket strip comprising uncured rubber and fibrous material.

10. In combination, a metal channel for receiving the edge of a glass, a glass in the channel and a channel shaped gasket material within the metal channel and receiving the edge of the glass, said gasket material comprising superimposed and bonded strips of an uncured rubber composition.

CHARLES H. WALKER.